3,557,033
COATINGS COMPOSITIONS FROM BLENDS
OF ALKYD RESINS AND STYRENE-ALLYL
ALCOHOL COPOLYMERS
William J. Brinton, 782 E. 19th St.,
San Bernardino, Calif. 92404
No Drawing. Filed June 25, 1969, Ser. No. 836,653
Int. Cl. C09d 3/52, 3/66, 3/76
U.S. Cl. 260—21                              7 Claims

ABSTRACT OF THE DISCLOSURE

A coating composition comprising a blend of an alkyd resin, a styrene-allyl alcohol copolymer and a hexa-alkoxy methyl melamine resin dissolved in a solution of a non-reactive low boiling solvent and a low boiling alcohol is prepared and applied to a heat sensitive substrate by low temperature baking.

BACKGROUND OF THE INVENTION

The field of art to which this invention pertains is synthetic resin mixtures of amine-aldehyde reaction products with polyol-polybasic carboxylic acid polyesters. More particularly this invention relates to a modification of said synthetic resin mixture with a styrene-allyl alcohol copolymer so as to form a low temperature curable coating composition for application to heat sensitive substrata.

The use of alkyd resins in conjunction with a melamine resin or a urea-aldehyde resin in baking applications is well known in the art. Likewise, the application of alkyd type resin systems to heat sensitive substrata is known. Normally, to convert a standard baking alkyd to a system which can be applied to a heat sensitive substrate, the original coating is modified with a large amount of an acid catalyst. This procedure produces coating solutions which have generally poor stability and which will gel within a few days after catalyzation. Thus coatings prepared by this modified method should be applied to the surface to be coated within a short time after catalyzation. Otherwise, solution viscosity will eventually increase to a point where application is nearly impossible. Finally gelation will result potentially causing the loss of a large amount of costly coating materials.

Yet another disadvantage of systems prepared in this manner is that even with the large amount of catalyst used, complete cure is difficult or impossible under the conditions preferably present when heat sensitive substrata are coated. This lack of complete cure results in films which have inadequate hardness, mar and solvent resistance. Although most of these highly catalyzed alkyd resin coatings will eventually post cure at room temperature to a finish possessing sufficient resistance properties, this process of continued curing after baking can take several weeks. When articles such as wood stock are stacked or packaged immediately after coating this lack of complete cure causes undesirable marring and scratching of the coated material.

Nitrocellulose lacquers are also well known in the art and have often been used in place of alkyd resins where faster curing at low temperatures is required. However, as with the aforementioned highly catalyzed alkyd resin systems, these nitrocellulose lacquers also are quite unstable when catalyzed. In addition, their resulting cured coatings tend to have poor solvent resistance. Finally, unlike alkyd resin coatings these lacquers require the use of expensive ketones and ester solvents to reduce solution solids to a suitable application viscosity.

SUMMARY OF THE INVENTION

Utilizing the compositions of this invention low temperature curable coatings are prepared which exhibit several distinct improvements over unmodified alkyd resin— melamine or urea-aldehyde coatings or nitrocellulose lacquers. The compositions of this invention will not gel when catalyzed; the cure rates are equal to and in some cases superior to nitrocellulose lacquers; and the produced films are superior to lacquers and alkyds in mar resistance, solvent resistance and overall film hardness and gloss.

The coating compositions disclosed herein comprise a mixture of about 50 to about 80 weight percent of an alkyd resin having an hydroxyl or oil content of about 1.3 to about 10 weight percent and a solids acid value of at least 4; about 12 to about 20 weight percent of a monomeric or partially polymerized hexa-alkoxy methyl melamine resin having a Gardner-Holdt (25° C.) viscosity of about P to about $Z_6$ at 100% solids; and about 11 to about 25 weight percent of a styrene-allyl alcohol copolymer having an hydroxyl content of from about 4 weight percent to about 10 weight percent. This mixture is dissolved in a solution of about 40 to 100 weight percent of a $C_1$ to $C_5$ alcohol having a boiling range of about 140° F. to 325° F. and about 60 to 0 weight percent of a non-reactive liquid solvent having a boiling point range of about 85° F. to about 325° F.

This coating composition can be applied to a heat sensitive substrate and baked at a temperature of about 100° F. to 300° F. for about 1 to 5 minutes producing a coating having excellent cure, hardness, solvent resistance and mar resistance. At the same time the substrate is not injured or degraded by the low temperature baking which is possible because of the rapid curing properties of this coating.

DESCRIPTION OF THE INVENTION

The term alkyd resin for the purpose of this invention is defined as any ester resin prepared by reacting a polyol with polybasic acid or a mixture of a polybasic acids and mono basic acids. Included in this definition are oil and fatty acid containing polyesters.

The alkyd resins used in preparing the compositions of this invention include those types normally used in baking applications. These resins can contain up to no more than about 45 weight percent of an oil or fatty acid. When the fatty acid or oil concentration is increased above the 45 weight percent level, cure response is lost and the resulting films are too soft and subject to mar and solvent attack. However, alkyd resins can be prepared which contain no fatty compound and are based upon polyols and polyacids only. These alkyd resins or oilless alkyds are especially useful for exterior applications and have a high degree of flexibility, adhesion, and possess unique elongation properties. Preferably, though, a fatty compound should be present in an amount equal to about 20 to about 45 weight percent of the total alkyd resin solids with the most preferable range being about 35 to 45 weight percent.

In addition the particular alkyd resin which is chosen should have a solids acid value of at least 4. Lower acid value alkyds exhibit poor cure response and film resistance properties. Preferably the acid value of the selected alkyd should be in the 6 to 12 acid value range, however, alkyds with an acid value as high as 30 can be employed if the curing catalyst concentration is reduced to compensate for the increased cure response that is observed with these higher acid value alkyds.

Finally, in order to insure proper interaction between the alkyd resin and the curing agent, the alkyd resin should have an hydroxyl content of from about 1.3 weight percent to about 10 weight percent, preferably about 2.0 to 5.0 weight percent. Hydroxyl content is defined as the weight ratio of hydroxyl groups per 100 parts of solid alkyd resin. Thus an alkyd resin having one equivalent of hydroxyl groups per 100 parts of resin would have a weight percent hydroxyl content of 17/100 or 17 percent.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed castor, dehydrated castor, perilla, cocoanut, oticia and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethylol propane, trimethylol ethane and the various glycols such as neopentyl, ethylene and propylene. Preferable among the above types of polyols are triols or mixtures of a major amount of a triol and a minor amount of a tetra-alcohol.

Typical of the carboxylic acids in addition to the aforementioned fatty acids are phthalic anhydride, isopthalic acid, adipic acid, azelaic acid, benzoic acid, etc. These acids may readily be replaced by any of the additional acids normally used in alkyd resin processing. The preferred system in addition to including the aforementioned preferred levels of a fatty compound should contain an aromatic dibasic acid or a mixture of said aromatic acid with an aliphatic dibasic acid.

An alkyd resin having the above constituents can be prepared by any of the standard alkyd processing techniques. When the resin has been prepared by these methods, the resulting polymer can be mixed with the remaining parts of this invention or this polymer can be dissolved in the solvents hereafter described and then blended with the remaining parts of this invention in the form of a solvent solution.

The amount of alkyd resin that can be blended with the other components of this invention can vary from 50 to 80 solids weight percent based on the total composition solids. Preferable results, through, are obtained when the alkyd resin is present in the 65 to 75 weight percent range.

The second component of this invention is a monomeric or partially polymerized hexa-alkoxy methyl melamine resin having a Gardner-Holdt viscosity (25° C.) of about P to $Z_6$ at about 100% solids. In some cases highly pure melamine resins will crystallize upon standing, however, viscosity readings can be obtained by melting the resin at elevated temperature and then quickly cooling to 25° C. This melamine resin can be present in amounts of from about 12 to 20 weight percent based on the total solids composition however, the 16 to 18 weight percent range is preferred. When the melamine resin content is reduced below 12%, cure speed is reduced, cure response is lost and resistance properties suffer. On the other hand increasing the melamine resin content above the 20% level increases the cost of the finished coating and, due to the plasticizing effect of the excess melamine resin present, films tend to be soft and quite susceptible to solvent attack and mar.

The preferred hexa-alkoxy methyl melamines are those derived from methoxy groups, e.g. hexamethoxy-methyl melamine.

Styrene-allyl alcohol copolymers as used in the compositions of this invention comprise those copolymers prepared by reacting styrene and allyl alcohol in a weight ratio so as to yield a polymer containing about 4 to about 10 weight percent hydroxyl groups. In other words the allyl alcohol content should vary from about 13.5 to about 34 weight percent of the total copolymer solids. Typical of these copolymers are those prepared by the methods of U.S. Pat. 2,894,938. Most preferable of these polymers are those which are prepared having an hydroxyl content of about 5 to about 6 weight percent.

The total concentration of these styrene-allyl alcohol copolymers can vary from about 11 to about 25 weight percent based on the total composition solids. When the styrene-allyl alcohol copolymer content is reduced below the 11 weight percent level, solvent resistance and film hardness suffer. On the other hand when this concentration is increased above the 25 weight percent level, the resulting cured film is gummy and overall cure response is retarded. In general the most preferred results are obtained when the styrene-allyl alcohol copolymer content is maintained in the 11 to 15 weight percent range.

In preparing solutions of the above component several methods can be employed. In one method the melamine resin, alkyd resin and styrene-allyl alcohol copolymers are each individually dissolved in the desired solvents and then these various solutions are blended together. In another method the above components are blended together and then this blend is dissolved in the solvents of choice. However, in the preferred method the alkyd resin is first dissolved in enough of the desired solvents to give it a workable viscosity (Gardner-Holdt at 25° C. of about less than $Z_8$). This resin solution is then added to the remainder of the components and the desired amount of additional solvents. Agitation of this solution produces a coating composition having a solids content of about 30 to 50 weight percent.

In order to apply and cure the compositions of this invention at a temperature sufficiently low to prevent injuring and degradation of the particular heat sensitive substrate, solvents with boiling points below about 350° F. should be used. In addition, at least about 40 weight percent of this solvent content should comprise a $C_1$ to $C_5$ alcohol. This large amount of alcohol is present in order to control the cure rate of the compositions of this invention. When amounts of alcohol less than about 40 weight percent of the total volatile content are present, cure response (the ability of the coating to cure to a tack free solvent resistant film) is lost in 2 to 12 hours. However, when at least about 40 weight percent alcohol is used cure response is maintained for 16 hours or longer. Preferably the alcohol content should be in the 40 to 65 weight percent range; however, solutions where the only solvent present is an alcohol are quite usable and produce acceptable results.

Among the alcohols which are of use as solvents in this invention are those having from 1 to 5 carbon atoms per molecule including methyl, ethyl, the propyl, the butyl and the amyl alcohols. In addition, however, the boiling point of the chosen alcohols should be between about 140° F. and 325° F. Alcohols which boil higher than about 325° F. require baking temperatures which tend to harm various heat sensitive substrata. The preferred alcohols from this $C_1$ to $C_5$ group are normal propanol, isopropanol and isobutanol.

The other solvent used in conjunction with the aforementioned alcohols is a non-reactive or inert liquid solvent, having no functional groups reactive with alcohols, carboxylic acids or vinyl compounds. This solvent can be present in an amount equal to from 60 to 0 preferably 60 to 35 weight percent of the total solvent composition. Included among the preferred solvents of this class are, toluene, xylene, ethyl benzene, VM&P naphtha, hexane and other aliphatic and aromatic solvents. Of special usefulness are xylene, toluene and VM&P naphtha. In addition as was discussed above solvents for use in this invention should have a low boiling point because of the danger of heat injury to the substrate that is used. Preferably this other inert liquid solvent should have a boiling range of about 85° F. to about 325° F., however, a small amount of this inert solvent can include a solvent with a boiling point higher than 325° F.

When the coating compositions as prepared above are to be applied to a substrate such as plywood which will immediately after baking be subject to abrasive forces such as are present when the materials are stacked together, additional freedom from tack and mar is desirable. When this additional property is needed, a waxy substance can be added. Included among these waxes are carnauba, polyethylene, paraffin and candelilla waxes as well as other synthetic and naturally occurring waxes. These waxes for preferred results should be added in an amount equal to about 0.25 to 4 weight percent based on the total solids of the coating composition.

In order to achieve low temperature curing using the compositions of this invention an acid catalyst must be used. Included are catalysts such as para-toluene sulfonic acid, methane sulfonic acid, butyl acid phosphate and other organic and mineral acids having at least one active hydrogen group per molecule. The amount of catalyst to be used depends upon the acid value of the alkyd resin which is selected. However, when the alkyd acid value is in the 4 to 12 range, catalyst concentration should range from about 2 to about 6% (preferably about 3.5 to 4.5 percent) based on the total volume of the final coating. It should be noted that since most of the above acid catalysts are crystalline at room temperature, solutions at about 50% solids in methanol or another solvent having a boiling point of less than about 325° F. are prepared to facilitate handling. The above volume percents are based on the addition of a 50% solids solution of these catalysts. Although this method is preferred the catalysts can be added in their 100% solids crystalline form if sufficient agitation is used to dissolve the solid catalyst in the coating solution. When the acid value of the alkyl resin is higher than about 12 the catalyst content can be proportionately reduced to compensate for the increased reactivity of these higher acid containing resins.

As was previously disclosed, when 40 weight percent of an alcohol is used in the solvent mixture of this invention, cure response is maintained for at least 16 hours. However, after this initial cure response is lost the coating solution must be re-catalyzed to bring about a return in these cure response properties. Normally, this second or additional catalyst addition comprises the same amount of catalyst as was initially added.

Thus a coating composition is produced which can be maintained indefinitely without gelation. However, when continued cure response is needed the coating must be re-catalyzed about every 16 hours.

If a lower gloss coating is desired the compositions as prepared above can be modified with from about 5 to about 25 weight percent of a flattening agent such as silica gel or other silicon or silicate containing materials.

In the following examples parts are understood to mean parts by weight.

DESCRIPTION OF THE PREFERRED EMBODIMENTS

Example I

Into a suitable container equipped with a mechanical agitator were added 90.0 parts of toluene and 46.9 parts of a flaked styrene-allyl alcohol copolymer having a solids acid number of less than 0.5, an hydroxyl content of 5.7, a specific gravity of 1.083, an approximate molecular weight of 1600 and an equivalent weight of about 300. This mixture was agitated until all of the styrene-allyl alcohol copolymer was dissolved in the toluene. To this resulting solution were added 505.3 parts of a 55 weight percent solids in xylene alkyd solution having a Gardner-Holdt (25° C.) viscosity of $Z_5$, a Gardner color of 6, a weight per gallon of 8.37 lbs., and an acid value of 9. This alkyd was formed by the esterification of 397 parts of tall oil fatty acid, 222 parts of glycerine, 48 parts of pentaerythritol, and 408 parts of phthalic anhydride. Added additionally were 69.6 parts of a hexamethoxy methyl melamine resin having a Gardner-Holdt viscosity (25° C.) of $Z_4$, and a weight per gallon of 10.1 lbs., 200 parts of isopropanol, 40 parts of a 20% by weight solution of carnauba wax in isobutanol and 48.2 parts of VM&P naphtha. Agitation of this mixture produced a coating composition having a weight per gallon of 7.75 lbs., and a viscosity (25° C.) of 22 seconds on a #2 Zahn cup at 40% solids.

39.6 gallons of a coating solution prepared in this manner was catalyzed with 0.4 gallons of a 50 percent by weight solution of para toluene sulfonic acid (PTSA) in methanol, applied to a hard board substrate and baked for 35 seconds at a surface temperature of 170° F. to 190° F. A clear glossy coating resulted having excellent hardness, mar and solvent resistance. 16 hours later this coating composition had not gelled. When 4% by volume of the above 50 weight percent PTSA solution was added to this ungelled coating solution and this solution applied and baked as above, a clear coating resulted equal in all respects to the first coating prepared.

Example II

Using the same procedure as in Example I, a coating composition was prepared using 512.5 parts of the alkyd resin solution of Example I, 47.5 parts of silica gel, 105.5 parts of xylol, 207.0 parts of isobutanol, 48.0 parts of the styreneallyl alcohol copolymer of Example I, 69.5 parts of the melamine resin of Example I, and 10 parts of a 10 weight percent solids solution of candelilla was in isobutanol. This coating composition exhibited a solids content of 45 percent, a weight per gallon of 8.16 lbs. and a viscosity of 43 seconds on the #4 Ford cup (25° C.).

Catalyzing the above solution with 4 percent by volume of a 50 weight percent PTSA solution in methanol, applying it to printed hardboard to a wet film thickness of 18 mils and baking for 2½ minutes at an oven temperature of 250° F. produced an excellent low gloss film. Evaluations of this film indicated excellent solvent and mar resistance, a gloss with the 60° glossmeter of 17–18 and a Sward hardness of 18–20.

Coatings prepared in this manner can be applied by any of the conventional methods including dipping, brushing, or spraying. However, when coatings are to be applied on a continuous painting line the preferred methods are roller coating or curtain coating. After the wet coating is applied, the usual procedure is to flash as much of the solvent as possible out of the coating by a blast of high velocity air. This step however is not always practical or necessary. Following either the coating step or the flash step the coated material is passed directly into a baking oven where the coated substrate is heated by an oven temperature of about 100° F. to 300° F. (preferably about 225° F. to 275° F.). Regardless of the oven temperature though the temperature of the substrate itself should be allowed to reach about 170° F. to 190° F. and be held at that temperature for about 30 to 40 seconds. Preferably this should require an actual time in the oven of about 2 to 3 minutes although in cases depending upon the substrate actual oven time can be as long as 5 minutes or as short as 1 minute.

The substrata to which the compositions of this invention can be applied include any of those which are heat sensitive, i.e., susceptible to heat degeneration. This invention is especially useful in the wood or hardboard coating area, however, these coatings can also be applied to plastic paper, foil, plastic-wood composition, or wood composition.

It is to be understood that the foregoing detailed description is given merely by way of illustration and that many variations may be made therein without departing from the spirit of the invention.

The embodiments of the invention in which an exclusive property or privilege is claimed are defined as follows:

1. A wood coating composition having at least a 16 hour cure response and being curable at a temperature of about 100° F. to 300° F., which comprises a solution of:
  50–80 weight percent of an alkyl resin derived from carboxylic acids containing only carbon hydrogen and oxygen, wherein said alkyd resin has a solids acid value of at least 4 and an hydroxyl content of about 1.3 to 10 weight percent;
  12–20 weight percent of a monomeric or partially polymerized hexa-methoxy methyl melamine resin having a Gardner-Holdt (25° C.) viscosity of about P to $Z_6$ at about 100 percent solids; and
  11–25 weight percent of a styrene-allyl alcohol copolymer having a hydroxyl content of from about 4 to about 10 weight percent
dissolved in a solvent mixture of:
  40 to 100 weight percent of an alcohol solvent having a boiling point range of from about 140° F. to about 325° F. and a carbon content of about 1 to 5 carbon atoms per molecule; and
  60 to 0 weight percent of a non reactive liquid solvent having a boiling point range of from about 85° F. to about 325° F.
and catalyzed with an acid catalyst solution.

2. The composition of claim 1 wherein the alkyd resin is based upon 20 to 45 weight percent of a fatty acid or oil derived from a fatty acid wherein said fatty acid contains from 12 to 24 carbon atoms per molecule; wherein the alkoxy group of the hexa alkoxy methyl melamine resin is methoxy; wherein the styrene-allyl alcohol copolymer has a hydroxyl content of from 5 to 6 weight percent; and wherein the alcohol solvent is selected from n-propanol, isopropanol and isobutanol and the non reactive liquid solvent is selected from xylene, VM&P naphtha and toluene.

3. The composition of claim 1 wherein the alkyd resin is present in an amount equal to 65 to 75 weight percent of the total solids composition, the melamine resin is present in an amount equal to 16 to 18 weight percent of the total solids composition, the styrene-allyl alcohol copolymers is present in an amount equal to 11 to 15 weight percent of the total solids composition and the alcohol solvent is present in an amount equal to 40 to 65 weight percent of the total solvent and the non reactive solvent is present in an amount equal to 60 to 35 weight percent of the total solvent.

4. The composition of claim 1 wherein the acid catalyst solution is added in an amount equal to about 2 to about 6 volume percent of the total volume of the coating composition solution of claim 1

5. The composition of claim 4 wherein the acid catalyst solution is a solution of para toluene sulfonic acid.

6. The composition of claim 1 wherein a waxy substance is added in an amount equal to about 0.25 to 4 weight percent based on the total composition solids.

7. The composition of claim 6 wherein the waxy substance is selected from carnauba, polyethylene, paraffin or candelilla waxes or mixtures thereof.

References Cited

UNITED STATES PATENTS

| | | | |
|---|---|---|---|
| 2,894,938 | 7/1959 | Chapin et al. | 260—23 |
| 2,962,460 | 11/1960 | Chapin et al. | 260—21 |
| 3,069,399 | 12/1962 | Abramo et al. | 260—23 |
| 3,297,785 | 1/1967 | George et al. | 260—850 |
| 3,402,219 | 9/1968 | Hill et al. | 260—850 |
| 3,451,955 | 6/1969 | Koral et al. | 260—21 |

M. J. WELSH, Primary Examiner

R. W. GRIFFIN, Assistant Examiner

U.S. Cl. X.R.

117—148, 149, 161, 168; 260—22, 23, 28, 28.5, 33.4, 33.6, 850, 855, 856

PO-1050
(5/69)

UNITED STATES PATENT OFFICE
CERTIFICATE OF CORRECTION

Patent No. 3,557,033      Dated January 19, 1971

Inventor(s) William J. Brinton

It is certified that error appears in the above-identified patent and that said Letters Patent are hereby corrected as shown below:

In the heading, Column 1, line 6, after "San Bernardino, Calif.92404" insert -- assignor to Celanese Coatings Company, corporation of Delaware --. Column 6, line 29, delete "was" and insert -- wax --. Column 7, line 3, delete "alkyl" and insert -- alkyd --; line 4 after "carbon" insert -- , -- (comma).

Signed and sealed this 25th day of May 1971.

(SEAL)
Attest:

EDWARD M. FLETCHER, JR.　　　　　WILLIAM E. SCHUYLER, JR
Attesting Officer　　　　　　　　　Commissioner of Patents